United States Patent
Yang

(10) Patent No.: US 7,427,886 B2
(45) Date of Patent: Sep. 23, 2008

(54) CLOCK GENERATING METHOD AND CIRCUIT THEREOF

(75) Inventor: Chia-Jung Yang, Taipei (TW)

(73) Assignee: Novatek Microelectronics Corp., Hsinchu (TW)

(*) Notice: Subject to any disclaimer, the term of this patent is extended or adjusted under 35 U.S.C. 154(b) by 70 days.

(21) Appl. No.: 11/161,131

(22) Filed: Jul. 25, 2005

(65) Prior Publication Data

US 2006/0250173 A1    Nov. 9, 2006

(30) Foreign Application Priority Data

May 5, 2005    (TW) .............................. 94114495 A

(51) Int. Cl.
*G06F 1/04* (2006.01)
(52) U.S. Cl. ...................... 327/291; 327/565
(58) Field of Classification Search ........................ None
See application file for complete search history.

(56) References Cited

U.S. PATENT DOCUMENTS

| | | | |
|---|---|---|---|
| 6,570,428 B1 * | 5/2003 | Liao et al. ................... 327/291 |
| 6,639,443 B1 * | 10/2003 | Campbell ................... 327/295 |
| 6,697,416 B1 | 2/2004 | Jennings ..................... 375/130 |
| 6,897,699 B1 * | 5/2005 | Nguyen et al. ............... 327/295 |
| 7,003,031 B1 * | 2/2006 | Sugita ........................ 375/238 |
| 7,106,117 B2 * | 9/2006 | Jung et al. .................. 327/277 |

* cited by examiner

*Primary Examiner*—Cassandra Cox
(74) *Attorney, Agent, or Firm*—Jianq Chyun IP Office

(57) ABSTRACT

A clock generating method and circuit are provided. The circuit includes a basic clock unit, a plurality of subclock units, which are connected in parallel or in series, and a plurality of special control units (SCU). The basic clock unit provides a basic clock signal and each of the clock units provides a corresponding clock signal. Each of the special control units are disposed between two adjacent clock units to delay the clock signal generated by the clock unit connected to the output terminal of the special control units.

14 Claims, 5 Drawing Sheets

CLOCK GENERATING METHOD AND CIRCUIT THEREOF

CROSS-REFERENCE TO RELATED APPLICATION

This application claims the priority benefit of Taiwan application serial no. 94114495, filed on May 5, 2005. All disclosure of the Taiwan application is incorporated herein by reference.

BACKGROUND OF THE INVENTION

1. Field of Invention

The present invention relates to a method for generating a clock and the circuit. More particularly, the present invention relates to a method for generating multiple clocks and the circuit.

2. Description of Related Art

Most of the integrated circuits in operations need at least one clock for synchronously controlling the several operations. Therefore, at least a main clock and the other subclock generated by the main clock are needed in use. In addition, multiple clocks are usually generated for general applications in different purposes or different operations. In the integrated circuit, for a processing system, the different clock has different individual period. For the commands in a processing system, when any one of the commands is executed, it has the option by taking several different clock or a combination of these clocks. The rising time for the clock basically is the shorter the better. However, it also needs the sufficient period to allow all of the operation commands to be complete. For example, some operations need to be complete in one clock period. Thus, it is often necessary to duplicate the clock and add together, so as to obtain the intended multiple clocks.

Conventionally, the issue usually occurred in the integrated circuit is at the rising edge or the falling edge, at which the voltage is instantly brought up or down, inducing and causing the electromagnetic interference (EMI). The EMI would affect the operation in the integrated circuit. For example, in the circuit of complementary metal-oxide semiconductor (CMOS), the transient leakage current occurs. The transient leakage current, with respect to the device of the integrated circuit, would be a large source in causing EMI.

Referring to FIG. 1, it is a drawing, schematically illustrating a conventional circuit for generating clock. A spread spectrum device 100 is connected with multiple subclock devices 102. Wherein, each of the subclock device is a circuit having a buffer 104 connected with multiple flip-flop units 106. As a result, a basic clock src_clk can be used to synchronously generate multiple subclocks.

Referring to FIG. 2A, it is a drawing, schematically illustrating a conventional clock timing chart with falling-edge trigger. It includes a main clock, a first subclock, a second subclock, a command clock, and a confirmation clock. According to any one of the main clock, the first subclock and the second subclock, the command clock is generated. A command of the command clock is received at the falling edge of the first subclock for triggering the confirmation clock. A confirmation signal of the confirmation clock is received at the just next rising-edge trigger of the second subclock after the command clock is issued.

Referring to FIG. 2B, it is a drawing, schematically illustrating a conventional clock timing chart with rising-edge trigger. It includes a main clock, a first subclock, a second subclock, a command clock, and a confirmation clock. According to any one of the main clock, the first subclock and the second subclock, the command clock is generated. A command of the command clock is received at the rising edge of the first subclock for triggering the confirmation clock. A confirmation signal of the confirmation clock is received at the just next rising-edge trigger of the second subclock after the command clock is issued.

FIG. 3 is a drawing, schematically illustrating leakage current at the edge of a pulse signal. Referring to FIG. 3, for the manners of the falling-edge trigger or the rising-edge trigger in clock as shown in FIG. 2A or FIG. 2B, the disadvantage is that when multiple subclocks are synchronous generated, the pulse edge of the clock in synchronous rising or falling would induce a leakage current. In addition, after accumulation of all of the leakage current caused by the subclocks, it causes a tremendous amount of EMI. This EMI also causes a skew on the pulse edges for the clocks that are originally synchronous.

In order to solve the foregoing issues, a digital spread spectrum clock generator has been developed in the conventional design. This clock generator can reduce the EMI effect by dispersing the EMI effect in the frequency domain. However, in this method, it needs an oscillating frequency for the necessary dispersing and therefore causes the clock frequency in the system to be random, resulting in the more complicate control on the clock. Thus, it is strongly needed to have a method for generating clock with reduced EMI and a circuit for performing the method.

SUMMARY OF THE INVENTION

One of objectives of the invention is providing a clock generating method, capable of generating a plurality of subclocks with different delay times for reducing the generated transient leakage current caused by inducing, and thereby reducing the EMI.

Another objective of the present invention is to provide a clock generating circuit, used to generate multiple subclocks with different delay time, so as to reduce the induced transient leakage current and reduce the EMI.

To at least achieve the foregoing objectives, the invention provides a clock generating method. The method includes providing a basic clock. Then, the plurality of delay times is used to delay the basic clock, so as to generate a plurality of subclocks.

In the foregoing clock generating method, for an embodiment, when the chip is operated in a frequency of 10 MHz, the delay time can be between 2 ns and 5 ns, wherein the delay time is related to the frequency of the chip.

In the foregoing clock generating method, an embodiment further includes providing a command clock according to any one of the basic clock and the subclocks, so as to serve as a command signal. In addition, according to the command clock, a confirmation clock is provided to serve as a confirmation signal.

From the other aspect, the invention provides a clock generating circuit, which includes a basic clock; a plurality of subclock units coupled in parallel; and a plurality of special control units coupled in series. The basic clock circuit is used to provide a basic clock. Each of the subclock units is used to generate a subclock. Each of the special control units is coupled between two adjacent subclock units, to respectively delay a delay time for the the basic clock.

Since the invention applies the delay time to the clock generating method or circuits for the subclocks, the subclocks has a delay time, so as to solve the conventional EMI problem caused by the transient leakage current at the synchronous clock edges. As a result, a better clock can be obtained.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
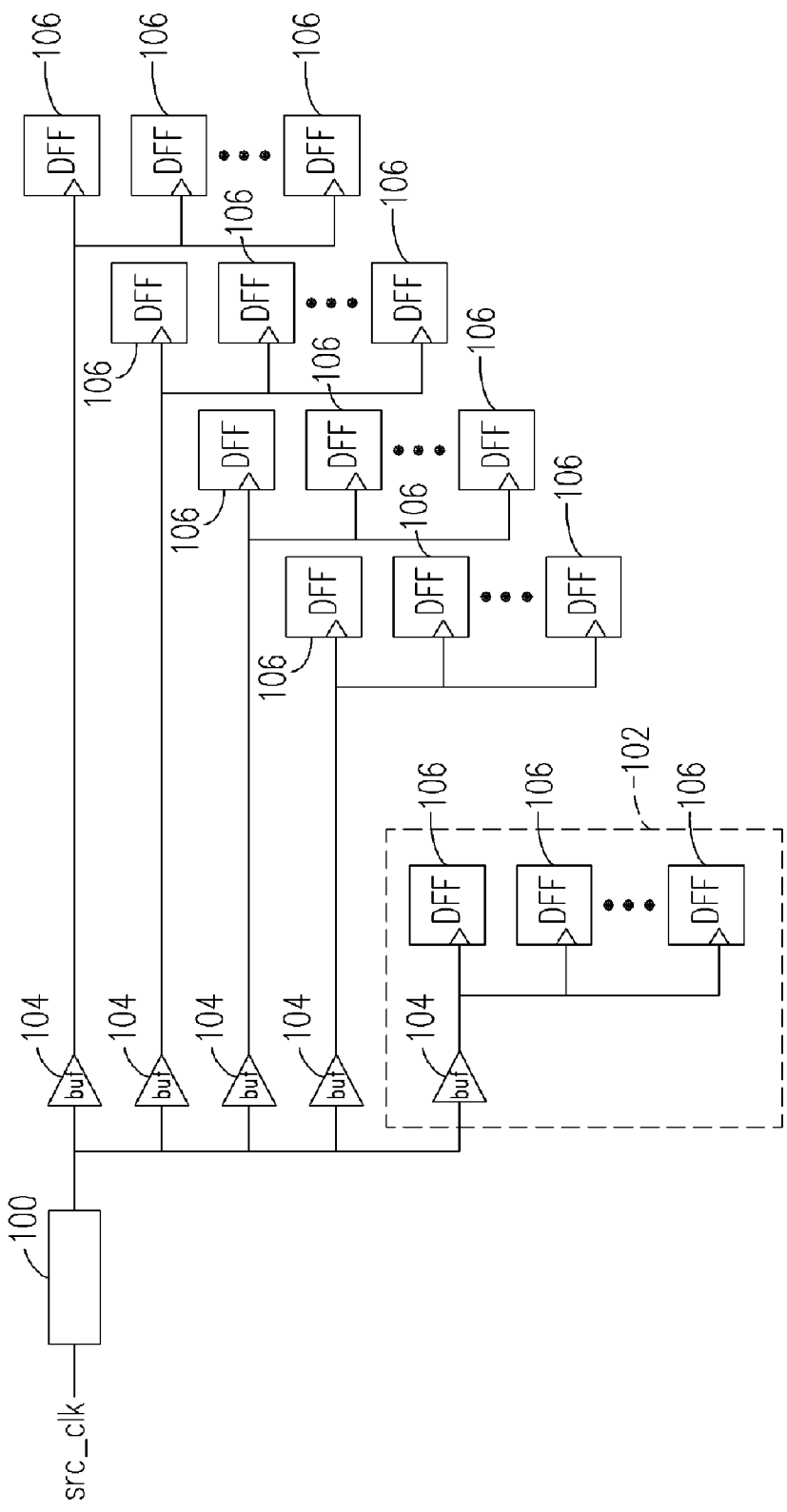
FIG. 1 is a circuit diagram, schematically illustrating a conventional clock generating circuit.
Figure 2A:
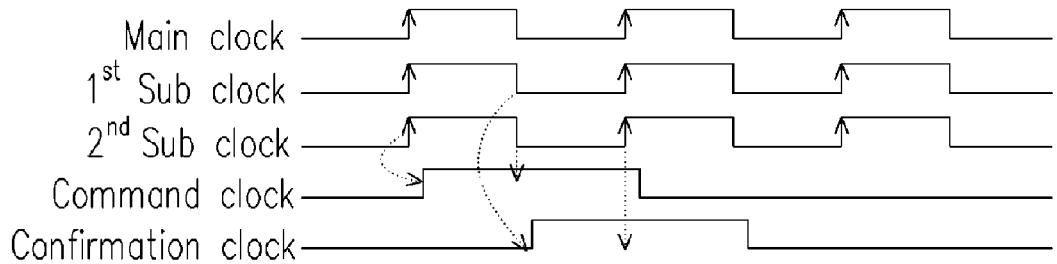
FIG. 2A is a drawing, schematically illustrating a conventional clock timing chart with falling-edge trigger.
Figure 2B:
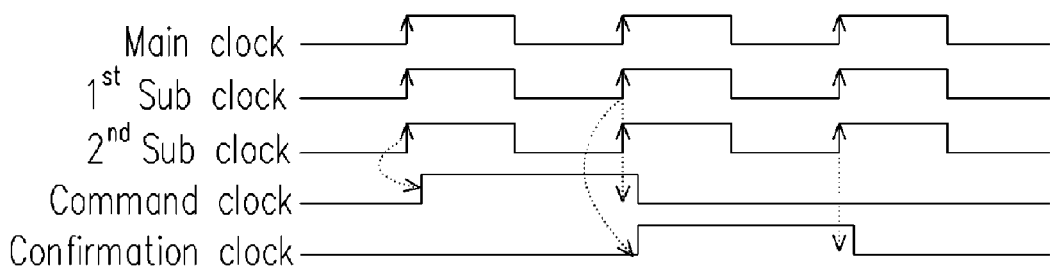
FIG. 2B is a drawing, schematically illustrating a conventional clock timing chart with rising-edge trigger.
Figure 3:
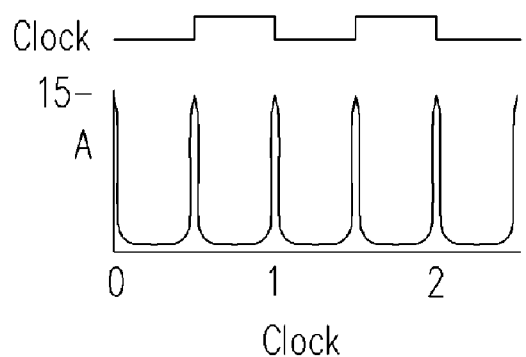
FIG. 3 is a drawing, schematically illustrating leakage current at the edge of a pulse signal.
Figure 4:
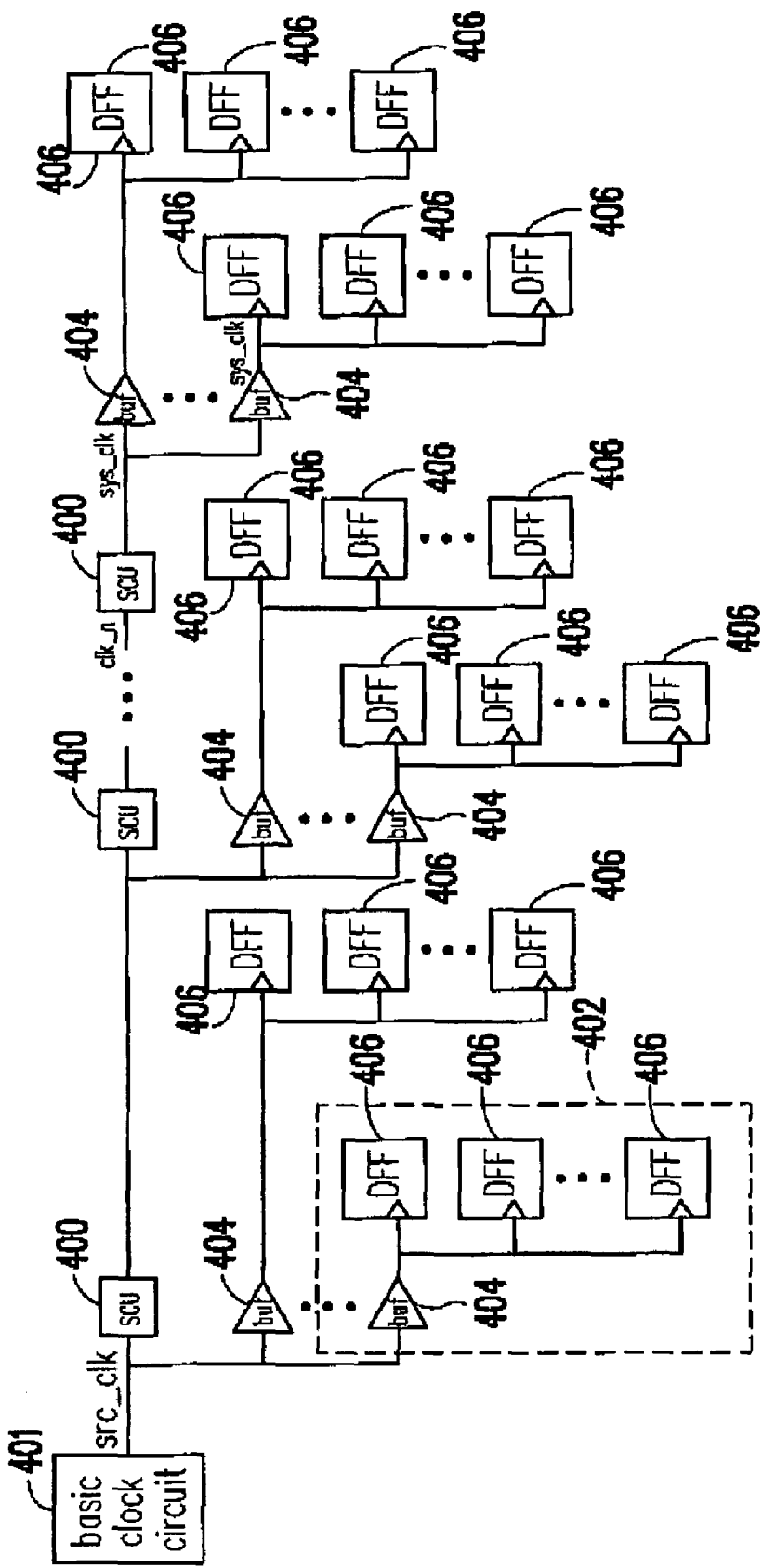
FIG. 4 is a circuit diagram, schematically illustrating a clock generating circuit, according to an embodiment of the present invention.

FIG. 4 is a circuit diagram, schematically illustrating a clock generating circuit, according to an embodiment of the present invention. In FIG. 4, the clock generating circuit includes a number of special control units 400, coupled in series, a basic clock circuit 401 for generating a basic clock src_clk and a number of subclock units 402. Each of the special control units 400 has an input terminal or an output terminal, coupled to at least one subclock unit, and each of the special control units 400 has a delay time to delay the basic clock src_clk so as to provide thereof to corresponding subclock units 402. The delay times can be the same or different. Remarkably, in the embodiment of FIG. 4, the output terminal of each special control unit 400 is coupled with two subclock units 402. However, the invention is not limited to this embodiment.

In an embodiment of the invention, each subclock unit 402 of the foregoing clock generating circuit includes, for example, a buffer 404 and at least a flip-flop 406. The flip-flop 406 is coupled with the buffer 404 in parallel series.

Figure 5A:
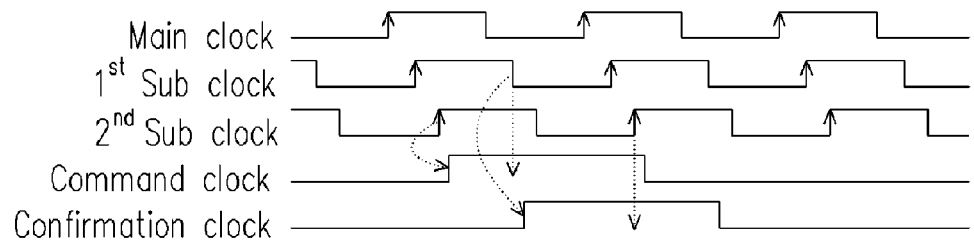
FIG. 5A is a drawing, schematically illustrating a clock timing chart with falling-edge trigger, according to the embodiment of the present invention.

Referring to FIG. 5A, it is a drawing, schematically illustrating a clock timing chart with falling-edge trigger, according to the embodiment of the present invention, including a main clock a first subclock, a second subclock, a command clock and a confirmation clock. Wherein, the main clock triggers the first subclock after a delay time. After the first subclock is triggered, a second subclock is triggered by further a delay time. Thus, between the clocks, each next clock is generated after a delay time. The command clock can be generated according to any one of the main clock, the first subclock, and the second subclock. The first subclock at the falling edge receives the command from the command clock, so as to trigger the confirmation clock. A next rising edge of the second clock triggers to obtain a confirmation signal of the confirmation clock after the command clock is issued.

Figure 5B:
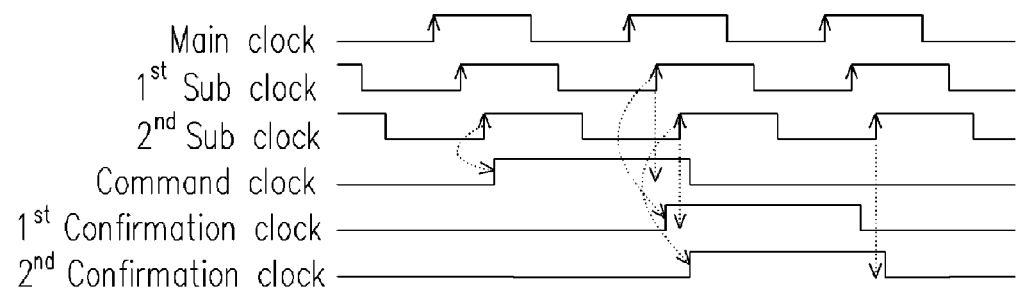
FIG. 5B is a drawing, schematically illustrating a clock timing chart with rising-edge trigger, according to the embodiment of the present invention.

FIG. 5B is a drawing, schematically illustrating a clock timing chart with rising-edge trigger, according to the embodiment of the present invention, including a main clock, a first subclock, a second subclock, a command clock, and a confirmation clock. Wherein, after the main clock is generated, the first subclock is triggered after a delay time. After the first subclock is triggered, the second subclock is generated further after a delay time. Therefore, between the clocks, each the clock is generated after a delay time. The command clock can be generated according to any one of the main clock and the subclocks. In this embodiment, the command clock is triggered after the rising edge of the second subclock. The first subclock triggers a first confirmation clock at a next rising edge after the command clock is issued. The second subclock triggers a second confirmation clock at a next rising edge after the command clock is issued. The confirmation signal of the confirmation clock is received at the next second rising edge of the second subclock after the command clock is issued.

About the delay time, in the embodiment, it is assumed that the special control unit simply is a delay device. Then, the delay time can be, for example, larger than the transmission delay of a flip-flop added with a maximum combined delay between two flip-flop's, a setting time of the flip-flop (usually is 0), and a delay time for protecting the frequency. Taking a chip operated under 10 MHz as the example, if the transmission delay is 0.5 ns, the maximum combined delay is 1 ns, then the delay time is preferably set to be 2 ns, wherein the delay time for protecting the frequency is 0.5 ns. If the whole design needs to separate the clocks into 10 stages, and it has the design with the falling edge clock, the maximum option for the delay device is 100 divided by 2, in half cycle, and further divided by 10. As a result, the limitation is 5 ns. This is obtained by dividing the system clock with 2, then dividing N number of stages of the special control units. For the design that the system frequency is greater then 100 MHz, it needs to use the logic device with faster operation speed to serve as the special control unit.

Figure 6:
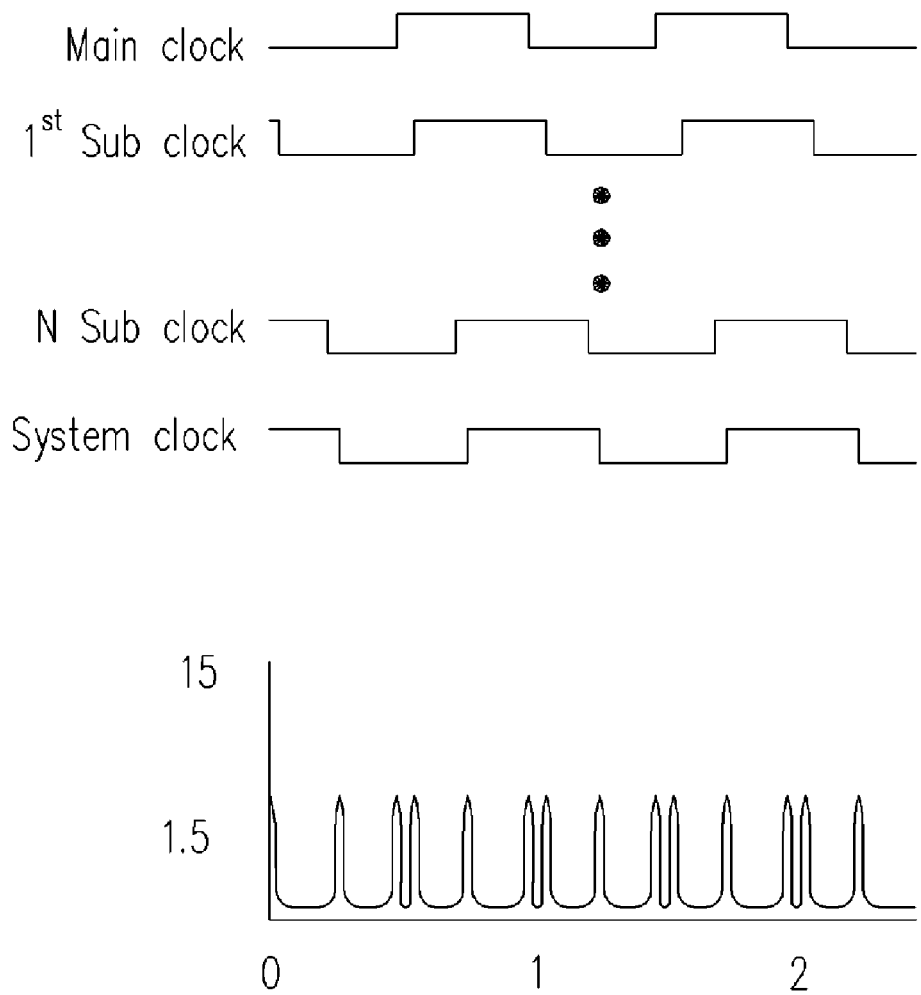
FIG. 6 is a drawing, schematically illustrating an improved phenomenon of leakage current at the edge of a pulse signal.

Therefore, the subclocks are generated respectively with a delay time. In conventional issues, the synchronized pulse edges are in shift due to the leakage current and the accumulation of the shift causes a tremendous EMI, which causes a skew on the on the pulse edges, which are originally synchronous. In FIG. 6 of the invention, the accumulation at the pulse edges can be dispersed into several small pulses due to the delay time. As a result, the EMI issue caused by the leakage current can be effectively reduced.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A clock generating method, comprising:
   providing a basic clock; and
   providing a plurality of different delay times to delay the basic clock for generating a plurality of subclocks;
   wherein the different delay times are provided by a frequency of a chip.

2. The clock generating method of claim 1, wherein when the clock generating method is applied to the chip with the frequency of 10 MHz, the different delay times are between 2 ns and 5 ns.

3. The clock generating method of claim 1, further comprising:
   generating a command clock by the chip, according to one of the basic clock and the subclocks, to serve as a command signal.

4. The clock generating method of claim 3, further comprising:
generating a confirmation clock by the chip, according to the command clock, to serve as a confirmation signal.

5. A clock generating circuit, comprising:
a basic clock circuit, used to provide a basic clock;
a plurality of special control units coupled in series, wherein each of the special control units is used for delaying the basic clock by one of a plurality of different delay times, and an input terminal of the first special control unit is coupled to the basic clock circuit for receiving the basic clock; and
a plurality of subclock units coupled in parallel, wherein each of the subclock units is used for generating a subclock according to the basic clock or the delayed basic clock;
wherein the first subclock unit is coupled to the input terminal of the first special control unit, and the other subclock units are respectively and correspondingly coupled to an output terminal of the $i^{th}$ special control unit and an input terminal of the $(i+1)^{th}$ special control unit, where i is an positive integer.

6. The clock generating circuit of claim 5, wherein the subclock unit comprises:
a buffer; and
at least a flip-flop, coupled to the buffer in series.

7. The clock generating circuit of claim 5, wherein the different delay times are provided by a frequency of a chip, which is used in the clock generating circuit.

8. The clock generating circuit of claim 7, wherein when the clock generating circuit is applied to the chip with the frequency of 10 MHz, the different delay times are between 2 ns and 5 ns.

9. The clock generating circuit of claim 8, further comprising:
generating a command clock by the chip, according to one of the basic clock and the subclocks, to serve as a command signal.

10. The clock generating circuit of claim 9, further comprising:
generating a confirmation clock by the chip, according to the command clock, to serve as a confirmation signal.

11. A clock generating circuit, comprising:
a basic clock circuit, used to provide a basic clock; and
a plurality of special control units coupled in series, wherein an input terminal or an output terminal of each of the special control units is coupled with at least one subclock unit, each subclock unit being used to generate a subclock;
wherein each of the special control units is used for delaying the basic clock by one of a plurality of different delay times, and an input terminal of the first special control unit is coupled to the basic clock circuit for receiving the basic clock.

12. The clock generating circuit of claim 11, wherein the subclock unit comprises:
a buffer; and
at least a flip-flop, coupled to the buffer in series.

13. The clock generating circuit of claim 11, wherein the different delay times are provided by a frequency of a chip, which is used in the clock generating circuit.

14. The clock generating circuit of claim 13, wherein when the clock generating circuit is applied to the chip with the frequency of 10 MHz, the different delay times are between 2 ns and 5 ns.

* * * * *